United States Patent
Liu et al.

(10) Patent No.: US 10,136,060 B2
(45) Date of Patent: Nov. 20, 2018

(54) IP CAMERA CONTROL METHOD, APPARATUS, AND SYSTEM

(71) Applicant: Huawei Technologies Co., Ltd., Shenzhen (CN)

(72) Inventors: Can Liu, Shenzhen (CN); Gaofei Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/624,371

(22) Filed: Jun. 15, 2017

(65) Prior Publication Data
US 2017/0366753 A1    Dec. 21, 2017

(30) Foreign Application Priority Data
Jun. 15, 2016 (CN) .......................... 2016 1 0422371

(51) Int. Cl.
| | | |
|---|---|---|
| H04N 5/232 | (2006.01) | |
| H04L 12/26 | (2006.01) | |
| H04L 12/12 | (2006.01) | |
| H04L 12/28 | (2006.01) | |
| H04L 12/24 | (2006.01) | |
| H04W 84/12 | (2009.01) | |

(52) U.S. Cl.
CPC ......... *H04N 5/23241* (2013.01); *H04L 12/12* (2013.01); *H04L 12/2803* (2013.01); *H04L 41/0833* (2013.01); *H04L 43/10* (2013.01); *H04N 5/23206* (2013.01); *H04N 5/23245* (2013.01); *H04W 84/12* (2013.01)

(58) Field of Classification Search
CPC .......... H04N 5/23241; H04N 5/23245; H04N 5/23206; H04L 43/10; H04W 84/12
See application file for complete search history.

(56) References Cited

U.S. PATENT DOCUMENTS

| | | | | |
|---|---|---|---|---|
| 8,069,157 B2* | 11/2011 | Jam | .......................... | G06F 21/32 707/705 |
| 2002/0152211 A1 | 10/2002 | Jam | | |
| 2016/0080239 A1* | 3/2016 | Buenrostro | ............. | H04L 43/10 709/224 |

(Continued)

FOREIGN PATENT DOCUMENTS

| | | |
|---|---|---|
| CN | 104537796 A | 4/2015 |
| CN | 104618468 A | 5/2015 |
| CN | 105050164 A | 11/2015 |

OTHER PUBLICATIONS

Foreign Communication From a Counterpart Application, Extended European Application No. 17176073.9, Extended European Search Report dated Oct. 26, 2017, 7 pages.

(Continued)

*Primary Examiner* — Padma Haliyur
(74) *Attorney, Agent, or Firm* — Conley Rose, P.C.

(57) ABSTRACT

An Internet Protocol (IP) camera control method, apparatus, and system to prevent the IP camera from being always in a working state, where the method includes waiting, by the IP camera, for receiving a standby instruction, where the IP camera is currently in the working state, and switching, by the IP camera, from the working state to a standby state when the IP camera receives the standby instruction from a server, such that power consumption of the IP camera is reduced.

20 Claims, 7 Drawing Sheets

(56) References Cited

U.S. PATENT DOCUMENTS

2016/0105847 A1    4/2016   Smith et al.

OTHER PUBLICATIONS

Machine Translation and Abstract of Chinese Publication No. CN104537796, Apr. 22, 2015, 14 pages.
Machine Translation and Abstract of Chinese Publication No. CN104618468, May 13, 2015, 20 pages.
Machine Translation and Abstract of Chinese Publication No. CN105050164, Nov. 11, 2015, 24 pages.
Foreign Communication From a Counterpart Application, Chinese Application No. 201610422371.8, Chinese Office Action dated Jun. 28, 2018, 10 pages.

* cited by examiner

IP CAMERA CONTROL METHOD, APPARATUS, AND SYSTEM

CROSS-REFERENCE TO RELATED APPLICATION

This application claims priority to Chinese Patent Application No. 201610422371.8 filed on Jun. 15, 2016, which is hereby incorporated by reference in its entirety.

TECHNICAL FIELD

The present disclosure relates to the field of information technologies, and in particular, to an Internet Protocol (IP) camera control method, apparatus, and system.

BACKGROUND

Because a network video surveillance system can remotely monitor a picture of a scene in real time using a network, the network video surveillance system is applied more widely.

Currently, the network video surveillance system mainly includes a front-end IP camera responsible for video capture and a back-end network video recorder (NVR) responsible for storage, forwarding, and management. The IP camera is a camera that can generate a digital video stream and transmit the generated video stream to the NVR using a wired or wireless network.

However, the IP camera in the current network video surveillance system is powered by a power adapter. After the IP camera is powered on, video recording is performed continuously. Because of long-time recording after power-on, the IP camera always consumes power, and power consumption is increased.

SUMMARY

The present disclosure provides an IP camera control method, apparatus, and system to prevent an IP camera from being always in a working state and reduce power consumption of the IP camera.

According to a first aspect, the present disclosure provides an IP camera control method, including waiting, by an IP camera in a working state, for receiving a standby instruction input by a user, and switching from the working state to a standby state when receiving the standby instruction. The IP camera is powered on to work and record a video when required by the user. At other times, the IP camera enters the standby state. Because power consumption of the IP camera in the standby state is low, the IP camera is prevented from being always in the working state, and power consumption of the IP camera is reduced.

With reference to the first aspect, in a first implementation of the first aspect, before switching from the working state to the standby state, the IP camera constructs a heartbeat packet to be transmitted between the IP camera and a server, and the IP camera sends the heartbeat packet to the server at a first preset frequency such that the IP camera maintains a heartbeat connection to the server after switching from the working state to the standby state. Through the heartbeat packet construction by the IP camera, the server can also maintain a heartbeat connection to the IP camera and maintain a status of the IP camera even without support of an IP protocol stack.

With reference to the first implementation of the first aspect, in a second implementation of the first aspect, the IP camera receives first heartbeat information from the server in order to obtain a communication address and a port number of the server. The IP camera obtains second heartbeat information of the IP camera in order to obtain a communication address and a port number of the IP camera, and the IP camera constructs the heartbeat packet according to the port number of the server, the communication address of the server, the port number of the IP camera, and the communication address of the IP camera. The IP camera constructs the heartbeat packet according to the heartbeat information of the server and the heartbeat information of the IP camera. Therefore, even without support of the IP protocol stack, the IP camera can also maintain a heartbeat connection to the server and maintain the status of the IP camera.

With reference to the first implementation of the first aspect or the second implementation of the first aspect, in a third implementation of the first aspect, before sending the heartbeat packet to the server at the first preset frequency, the IP camera sends status update notification information to the server, notifying the server that the status of the IP camera is updated to the standby state. The IP camera sends the status update notification information to the server such that when the status of the IP camera changes, the server can update and maintain the status of the IP camera in time.

With reference to any one of the first aspect to the third implementation of the first aspect, in a fourth implementation of the first aspect, after switching from the working state to the standby state, the IP camera receives, at a third preset frequency, a beacon from a router. The IP camera connects to the router when receiving the beacon from the router, and the IP camera disconnects from the router at intervals of receiving a beacon from the router. The IP camera connects to the router when receiving the beacon from the router. The IP camera disconnects from the router at intervals of receiving a beacon from the router. Therefore, when the IP camera enters the standby state, power consumption of the IP camera in the standby state is reduced while a heartbeat connection between the IP camera and the router is maintained.

With reference to any one of the first aspect to the fourth implementation of the first aspect, in a fifth implementation of the first aspect, after switching from the working state to the standby state, the IP camera receives a wake-up packet from the server, and the IP camera switches from the standby state to the working state when detecting that the wake-up packet from the server matches a preset wake-up packet. The server sends the wake-up packet to the IP camera. The IP camera restarts and quickly goes online, and sends, within a time preset by the user, video data for the user to preview when the IP camera receives a wake-up instruction from the user.

With reference to any one of the first aspect to the fifth implementation of the first aspect, in a sixth implementation of the first aspect, when the IP camera receives the standby instruction, all video-related modules in the IP camera are powered off, and the IP camera switches from the working state to the standby state. The video-related modules in the IP camera are powered off, and only a power supply, a power management unit (PMU), a micro control unit (MCU), and a WI-FI module in the IP camera keep running when the IP camera receives the standby instruction. Therefore, power consumption is reduced, and the IP camera is prevented from being always in the working state, which may otherwise cause a problem of high power consumption of the IP camera and a short battery life.

According to a second aspect, the present disclosure provides an IP camera control method, including receiving, by a server, a standby instruction from a client, where the standby instruction includes a port number and a communication address of an IP camera, and sending, by the server, the standby instruction to the IP camera according to the port number and the communication address of the IP camera such that the IP camera switches from a working state to a standby state after receiving the standby instruction. The server forwards the standby instruction input by a user to the IP camera. Therefore, the IP camera is powered on to work and record a video when required by the user. At other times, the IP camera enters the standby state. Because power consumption of the IP camera in the standby state is low, the IP camera is prevented from being always in the working state, and power consumption of the IP camera is reduced.

With reference to the second aspect, in a first implementation of the second aspect, after sending the standby instruction to the IP camera, the server sends first heartbeat information to the IP camera, where the first heartbeat information includes a communication address and a port number of the server such that the IP camera constructs, according to the first heartbeat information, a heartbeat packet to be transmitted between the IP camera and the server, and the server receives, at a first preset frequency, the heartbeat packet from the IP camera such that the server maintains a heartbeat connection to the IP camera. The server sends the first heartbeat information to the IP camera such that the IP camera constructs the heartbeat packet. Therefore, the server can also maintain a heartbeat connection to the IP camera and maintain a status of the IP camera even without support of an IP protocol stack.

With reference to the first implementation of the second aspect, in a second implementation of the second aspect, before the server receives, at the first preset frequency, the heartbeat packet from the IP camera, the server receives status update notification information from the IP camera to learn that the status of the IP camera is updated to the standby state. The IP camera sends the status update notification information to the server such that the server can update and maintain the status of the IP camera in time when the status of the IP camera changes.

With reference to the first implementation of the second aspect or the second implementation of the second aspect, in a third implementation of the second aspect, the server receives a wake-up instruction from the client, where the wake-up instruction includes the port number and the communication address of the IP camera to be woken up, and the server sends a wake-up packet to the IP camera according to the port number and the communication address of the IP camera to be woken up such that the IP camera switches from the standby state to the working state when the wake-up packet received by the IP camera matches a preset wake-up packet. The server sends the wake-up packet to the IP camera. The IP camera restarts and quickly goes online, and sends, within a time preset by the user, video data for the user to preview when the IP camera receives a wake-up instruction from the user.

According to a third aspect, the present disclosure provides an IP camera, including a receiving module and a switching module, where the receiving module is configured to receive a standby instruction, and the switching module is configured to switch from a working state to a standby state when the standby instruction from a server is received.

The IP camera provided by the third aspect of the present disclosure is configured to execute the technical solution of the method embodiment shown in the first aspect. Implementation principles and technical effects thereof are similar, and details are not described again herein.

According to a fourth aspect, the present disclosure provides a server, including a receiving module and a sending module, where the receiving module is configured to receive a standby instruction from a client, and the sending module is configured to send the standby instruction to an IP camera according to a port number and a communication address of the IP camera such that the IP camera switches from a working state to a standby state after receiving the standby instruction.

The server provided by the fourth aspect of the present disclosure is configured to execute the technical solution of the method embodiment shown in the second aspect. Implementation principles and technical effects thereof are similar, and details are not described again herein.

According to a fifth aspect, the present disclosure provides an IP camera, including a receiver and a processor, where the receiver is configured to receive a standby instruction, and the processor is configured to switch from a working state to a standby state when the standby instruction from a server is received.

The IP camera provided by the fifth aspect of the present disclosure is configured to execute the technical solution of the method embodiment shown in the first aspect. Implementation principles and technical effects thereof are similar, and details are not described again herein.

According to a sixth aspect, the present disclosure provides a server, including a receiver and a transmitter, where the receiver is configured to receive a standby instruction from a client, and the transmitter is configured to send the standby instruction to an IP camera according to a port number and a communication address of the IP camera such that the IP camera switches from a working state to a standby state after receiving the standby instruction.

The server provided by the sixth aspect of the present disclosure is configured to execute the technical solution of the method embodiment shown in the second aspect. Implementation principles and technical effects thereof are similar, and details are not described again herein.

According to a seventh aspect, the present disclosure provides an IP camera control system, including a battery, the IP camera according to any one of the foregoing embodiments, and the server according to any one of the foregoing embodiments, where the IP camera is powered by the battery. The IP camera is powered by the battery and deployed flexibly. This avoids a disadvantage that a monitoring position is fixed and the monitoring position is limited when a current IP camera is powered by a power adapter. In addition, when required by a user, the IP camera is powered on to work and record a video. At other times, the IP camera enters a standby state. The IP camera may be prevented from being always in a working state, and power consumption of the IP camera is reduced.

The present disclosure provides an IP camera control method, apparatus, and system. A cloud server forwards a standby instruction to an IP camera when a user inputs the standby instruction on the client. The IP camera enters a standby state after receiving the standby instruction. After a monitoring condition is triggered, when required by the user, the IP camera may be powered on to work and record a video. At other times, the IP camera enters the standby state. Because power consumption of the IP camera in the standby state is low, the IP camera is prevented from being always in a working state, and power consumption of the IP camera is reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
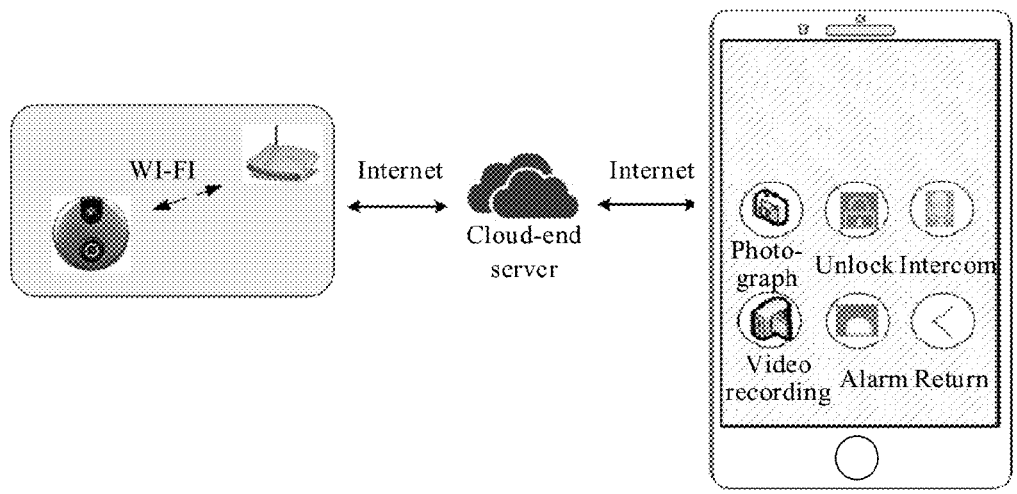
FIG. 1 is a diagram of an IP camera control system according to an embodiment of the present disclosure.

FIG. 1 is a diagram of an IP camera control system according to an embodiment of the present disclosure. As shown in FIG. 1, an IP camera accesses the Internet using WI-FI, and performs video capture and encoding and the like. A cloud-end server deploys, at a cloud end, videos captured by the IP camera, provides functions such as media storage, network address translation (NAT) penetration, and user authentication. With the help of the cloud-end server, a user can use a terminal (for example, a mobile client) to perform remote access control and management using a mobile network (for example, third generation (3G) or fourth generation (4G)), and preview the videos recorded by the IP camera.

The following describes technical solutions of the present disclosure in detail using specific embodiments. The following specific embodiments may be mutually combined, and same or similar concepts or processes may not be repeatedly described in some embodiments.

Figure 2:
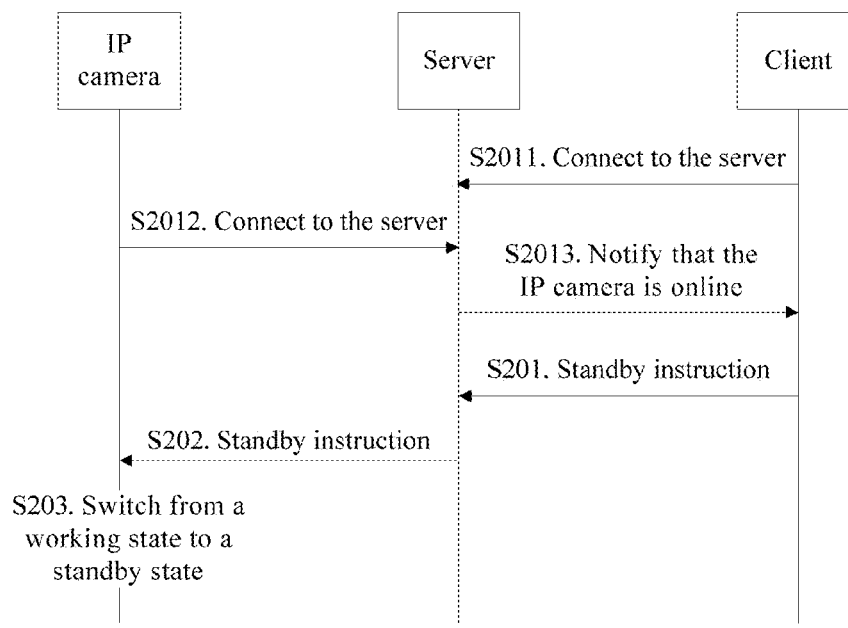
FIG. 2 is a signaling interaction diagram of an IP camera control method according to Embodiment 1 of the present disclosure.

FIG. 2 is a signaling interaction diagram of an IP camera control method according to Embodiment 1 of the present disclosure. As shown in FIG. 2, the method provided by this embodiment of the present disclosure includes the following steps.

Step S201: A client sends a standby instruction to a server.

The standby instruction includes a port number and a communication address of an IP camera.

It should be noted that, the client in this embodiment of the present disclosure may be a terminal such as a mobile phone, a tablet computer, or a notebook computer. This embodiment of the present disclosure is mainly described using a mobile client as an example, but is not limited thereto. The server in this embodiment of the present disclosure may be a cloud-end server (designated as cloud server hereinafter).

Further, before step S201, the method provided by this embodiment of the present disclosure may further include the following steps.

Step S2011: The client connects to the server.

Step S2012: An IP camera connects to the server.

Step S2013: The server notifies the client that the IP camera is online.

Further, when a monitoring condition is triggered, that is, when the client and the IP camera connect to the cloud server respectively and the IP camera connects to the cloud server, the cloud server notifies the client that the IP camera is online. In this case, the IP camera is powered on, and the IP camera is in a working state and starts to monitor and record a video. A user may input a standby instruction to a mobile client when the user considers that no useful information exists in a scene monitored by the IP camera and no IP camera is required for monitoring, where the standby instruction includes a port number and a communication address of an IP camera. The mobile client sends the standby instruction input by the user to the cloud server, notifying the cloud server which IP camera is allowed to enter a standby state.

It should be noted that, in this embodiment of the present disclosure, the IP camera is powered by a battery and deployed flexibly. This avoids a disadvantage that a monitoring position is fixed and the monitoring position is limited when a current IP camera is powered by a power adapter.

It should be noted that, in this embodiment of the present disclosure, the communication address may be a Media Access Control (MAC) address and/or an IP address.

Step S202: The server sends the standby instruction to the IP camera according to a port number and a communication address of the IP camera.

Further, the server can determine, according to the port number and the communication address of the IP camera, which IP camera needs to enter the standby state. The server may establish, using a wireless network such as BLUETOOTH or WI-FI, a connection to the IP camera that needs to stand by, and forward the standby instruction input by the user to the IP camera that needs to stand by such that the IP camera switches from the working state to the standby state after receiving the standby instruction.

Step S203: The IP camera switches from a working state to a standby state.

Figure 3:
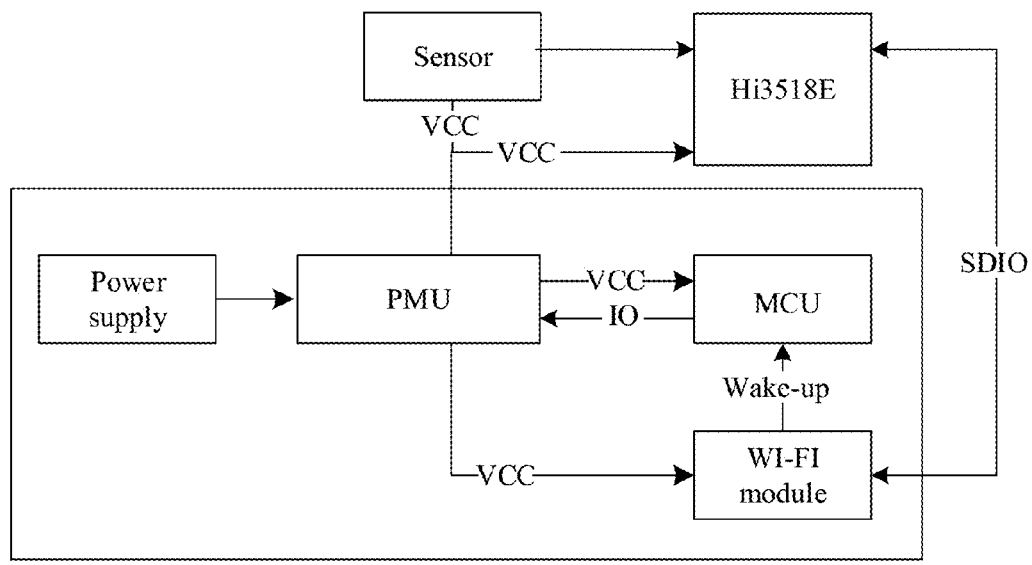
FIG. 3 is a block diagram of an IP camera according to an embodiment of the present disclosure.

Further, the IP camera receives the standby instruction from the server. All video-related modules in the IP camera are powered off, and the IP camera switches from the working state to the standby state when the IP camera receives the standby instruction from the cloud server. FIG. 3 is a system block diagram of the IP camera according to this embodiment of the present disclosure. As shown in FIG. 3, when the IP camera works normally, the battery is used as a power supply of the IP camera. Each module is powered by the power supply using a PMU. A security chip Hi3518E is responsible for video capture, processing, encoding, packetization, and network transmission using WI-FI. The security chip Hi3518E and an image sensor in the IP camera are powered off, and only the power supply, the PMU, an MCU, and a WI-FI module in the IP camera keep running when the IP camera receives the standby instruction from the cloud server. Therefore, power consumption is reduced, and the IP camera is prevented from being always in the working state, which may otherwise cause a problem of high power consumption of the IP camera and a short battery life.

In the IP camera control method provided by this embodiment of the present disclosure, a cloud server forwards a standby instruction to an IP camera when a user inputs the standby instruction on a client. The IP camera enters a standby state after receiving the standby instruction. The IP camera may be powered on to work and record a video after a monitoring condition is triggered, and when required by the user. At other times, the IP camera enters the standby state. Because power consumption of the IP camera in the standby state is low, the IP camera is prevented from being always in a working state, and power consumption of the IP camera is reduced.

Figure 4:
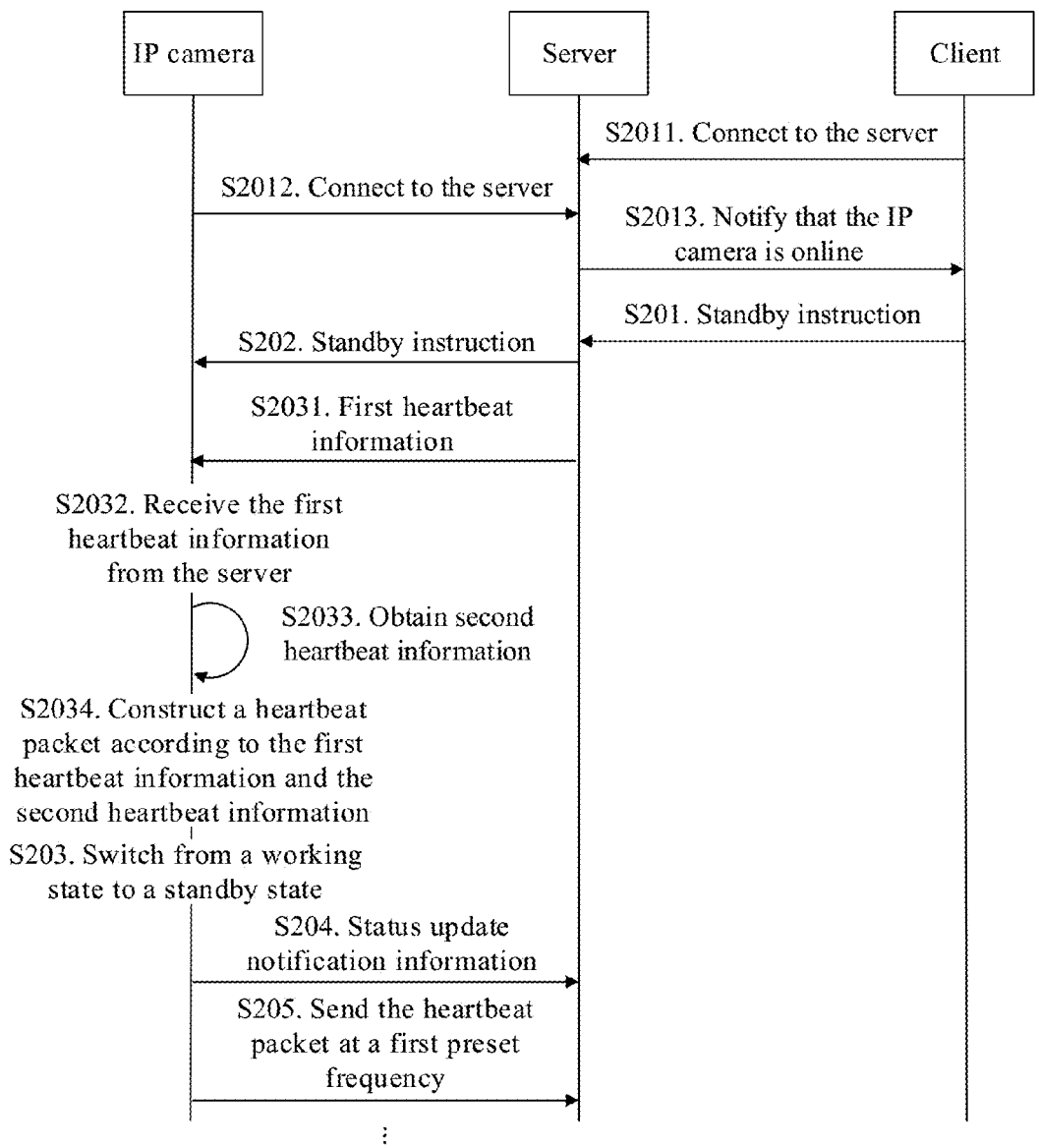
FIG. 4 is a signaling interaction diagram of an IP camera control method according to Embodiment 2 of the present disclosure.

FIG. 4 is a signaling interaction diagram of an IP camera control method according to Embodiment 2 of the present disclosure. As shown in FIG. 4, the method provided by this embodiment of the present disclosure is described in detail on a basis of the foregoing embodiment shown in FIG. 2.

The cloud server needs to maintain a status of the IP camera when the IP camera is in the standby state, and needs to determine whether the IP camera in the standby state is online in order to ensure a smooth network transmission link such that the IP camera can be normally woken up subsequently. In this embodiment of the present disclosure, before the IP camera switches from the working state to the standby state in step S203, the method further includes the following steps.

Step S2031: The server sends first heartbeat information to the IP camera.

The first heartbeat information includes a communication address and a port number of the server.

The server may send the first heartbeat information to the IP camera, and send the communication address and the port number of the cloud server to the IP camera when the server sends the standby instruction to the IP camera such that the IP camera constructs, according to the first heartbeat information, a heartbeat packet to be transmitted between the IP camera and the server.

Step S2032: The IP camera receives the first heartbeat information from the server.

The IP camera receives the first heartbeat information from the server to obtain the communication address and the port number of the server.

Step S2033: The IP camera obtains second heartbeat information.

The second heartbeat information includes the communication address and the port number of the IP camera.

The IP camera obtains the communication address and the port number of the IP camera when the IP camera receives the first heartbeat information from the server.

Step S2034: The IP camera constructs a heartbeat packet according to the first heartbeat information and the second heartbeat information.

The heartbeat packet is a data frame including the port number of the server, the communication address of the server, the port number of the IP camera, and the communication address of the IP camera.

The IP camera packetizes the port number of the server, the communication address of the server, the port number of the IP camera, and the communication address of the IP camera according to the first heartbeat information and the second heartbeat information and according to a requirement of a Transmission Control Protocol (TCP)/IP data packet before the IP camera enters the standby state, sets a packetized data frame as a heartbeat packet, and sets the heartbeat packet for the WI-FI module using a secure digital input and output card (SDIO) interface.

It should be noted that, frame protocols and frame structures used by different data frames are different if TCP/IP data packets for service transmission are different. The first heartbeat information and the second heartbeat information in this embodiment of the present disclosure may further include information such as a sequence number of the TCP packet and a window size. This is not limited and not described again in this embodiment of the present disclosure.

In actual application, the server cannot maintain a heartbeat connection to the IP camera or keep the IP camera online without support of a standard protocol stack (such as an IP protocol stack) when the IP camera is in the standby state. In this embodiment of the present disclosure, by performing steps S2031 to S2034, before the IP camera enters the standby state, the IP camera constructs the heartbeat packet to be transmitted between the IP camera and the server such that the server can also maintain a heartbeat connection to the IP camera and maintain the status of the IP camera without support of the IP protocol stack. This, on the one hand, avoids a problem that packetization and transmission cannot be performed in WI-FI without a standard protocol stack, and on the other hand, resolves a problem that a main controller needs to participate in the keepalive of the IP camera.

Further, in the embodiment shown in FIG. 4, after the IP camera switches from the working state to the standby state in step S203, the method includes the following steps.

Step S204: The IP camera sends status update notification information to the server.

The status update notification information notifies that the status of the IP camera is updated to the standby state.

Further, after the IP camera enters the standby state, the IP camera sends the status update notification information to the server. Correspondingly, the server receives the status update notification information from the IP camera such that when the status of the IP camera changes, the server can update and maintain the status of the IP camera in time.

Step S205: The IP camera sends the heartbeat packet to the server at a first preset frequency.

Further, the IP camera maintains a heartbeat connection to the server. Correspondingly, the server detects, at the first preset frequency, whether the heartbeat packet from the IP camera is received. If the server receives, at the first preset frequency, the heartbeat packet from the IP camera, the server may determine that the IP camera is online and that a path is normal. If the server does not receive, at the first preset frequency, the heartbeat packet from the IP camera, the server may determine that the IP camera is abnormal due to various reasons, such as, for example power-off or network fault or the like.

It should be noted that, the first preset frequency is pre-agreed between the server and the IP camera. First preset frequencies between different servers and IP cameras may be the same, or may be different, and are not limited and not described again herein in this embodiment.

In the IP camera control method provided by this embodiment of the present disclosure, on a basis of the foregoing embodiment, a server sends first heartbeat information to an IP camera. The IP camera constructs a heartbeat packet according to the first heartbeat information from the server and obtained second heartbeat information, and the IP camera sends the heartbeat packet to the server at a first preset frequency. Therefore, the server can also maintain a heartbeat connection to the IP camera and maintain a status of the IP camera even without support of an IP protocol stack. In addition, after the IP camera enters a standby state, the IP camera sends status update notification information to the server such that when the status of the IP camera changes, the server can update and maintain the status of the IP camera in time.

Figure 5:
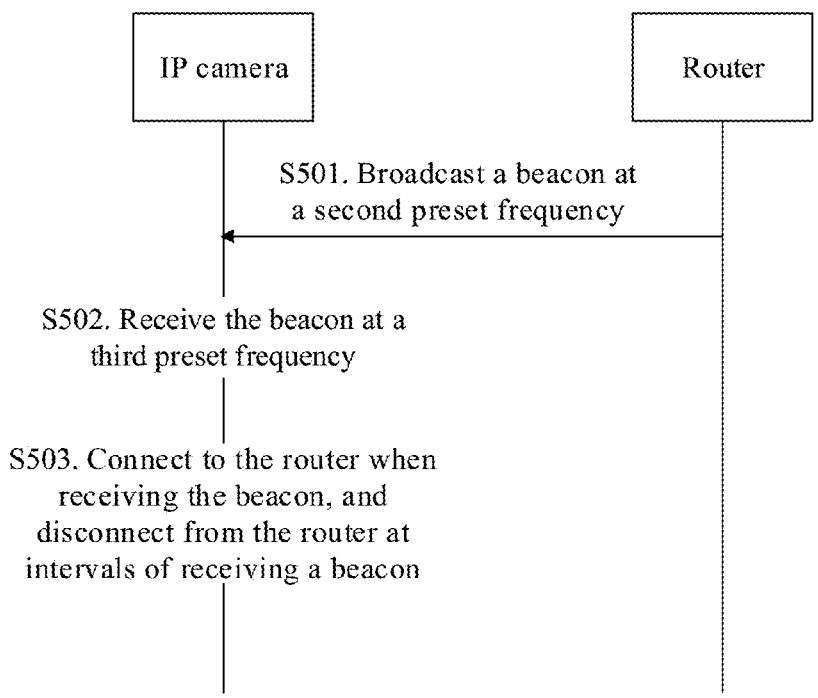
FIG. 5 is a signaling interaction diagram of an IP camera control method according to Embodiment 3 of the present disclosure.

FIG. 5 is a signaling interaction diagram of an IP camera control method according to Embodiment 3 of the present disclosure. As shown in FIG. 5, the method provided by this embodiment of the present disclosure is described in detail on a basis of the foregoing embodiments shown in FIG. 2 and FIG. 4.

After the IP camera enters the standby state, the WI-FI module in the IP camera enters a power saving mode, and the IP camera needs to maintain a heartbeat connection to a router using the WI-FI module. In this embodiment of the present disclosure, after the IP camera switches from the working state to the standby state in step S203, the method further includes the following steps.

Step S501: A router broadcasts a beacon at a second preset frequency.

Further, according to a standard 802.11 protocol defined by the Institute of Electrical and Electronics Engineers (IEEE) for a local area network, the router broadcasts a beacon at regular intervals (at the second preset frequency), where the beacon includes information such as a service set identifier (SSID) of the router. A beacon is generally in units of milliseconds (ms), and a preset value of a beacon interval is generally 100 ms.

It should be noted that, the second preset frequency refers to a beacon broadcast interval, and the second preset frequency is preset in the router. A manufacturer may define the second preset frequency at which the router broadcasts a beacon. This is not limited and not described again herein in this embodiment.

Step S502: The IP camera receives, at a third preset frequency, the beacon from the router.

The IP camera receives, at the third preset frequency, the beacon from the router, and accesses a corresponding sub-network in the router by identifying the service set identifier in the beacon.

Figure 6:
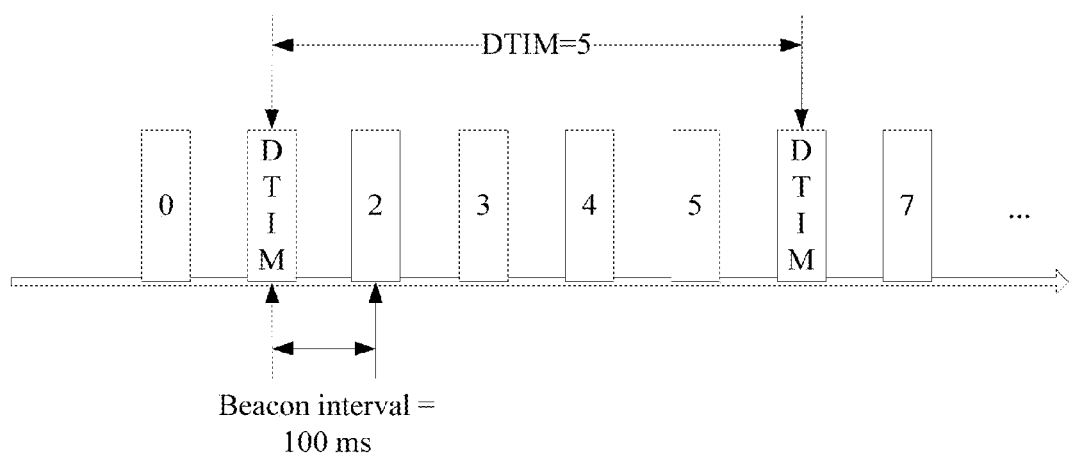
FIG. 6 is a schematic diagram of a beacon interval and a delivery traffic indication information (DTIM) according to an embodiment of the present disclosure.

It should be noted that, the third preset frequency refers to a beacon interval at which the IP camera is woken up, and may be set by the IP camera by configuring a DTIM. The DTIM is used in the power saving mode. The DTIM may be set to determine the beacon interval at which the IP camera is woken up. FIG. 6 is a schematic diagram of a beacon interval and a DTIM according to an embodiment of the present disclosure. As shown in FIG. 6, the beacon interval is 100 ms, and DTIM=5, that is, the IP camera is woken up at an interval of five beacons.

Step S503: The IP camera connects to the router when receiving the beacon from the router, and the IP camera disconnects from the router at intervals of receiving a beacon from the router.

The WI-FI module needs to turn on a radio frequency receiving unit when the IP camera receives the beacon from the router, and the IP camera connects to the router. The IP camera disconnects from the router at intervals of receiving a beacon from the router. Because the WI-FI module does not need to turn on the radio frequency receiving unit, that is, the radio frequency receiving unit is turned off, power consumption of the WI-FI module is very low, and power consumption of the IP camera in the standby state is reduced. In this case, the router buffers a data frame of the IP camera, and waits for the IP camera for waking up and synchronous receiving. Further, after the IP camera enters the standby state, that is, after the IP camera is powered off, the IP camera has no video service, and a data volume is very small. Therefore, the DTIM may be adjusted to greater than 5. In this case, a frequency at which the IP camera receives a beacon within a unit time is reduced, and total power consumption of the IP camera is reduced significantly. Further, the MCU in the IP camera may be a semiconductor STM81 MCU, and total power consumption of the IP camera may be reduced to a milliampere (uA) level.

In the IP camera control method provided by this embodiment of the present disclosure, on a basis of the foregoing embodiment, a router broadcasts a beacon at a second preset frequency. An IP camera receives, at a third preset frequency, the beacon from the router. The IP camera connects to the router when receiving the beacon from the router, and the IP camera disconnects from the router at intervals of receiving a beacon from the router. Therefore, when the IP camera enters a standby state, power consumption of the IP camera in the standby state is reduced while a heartbeat connection between the IP camera and the router is maintained.

Figure 7:
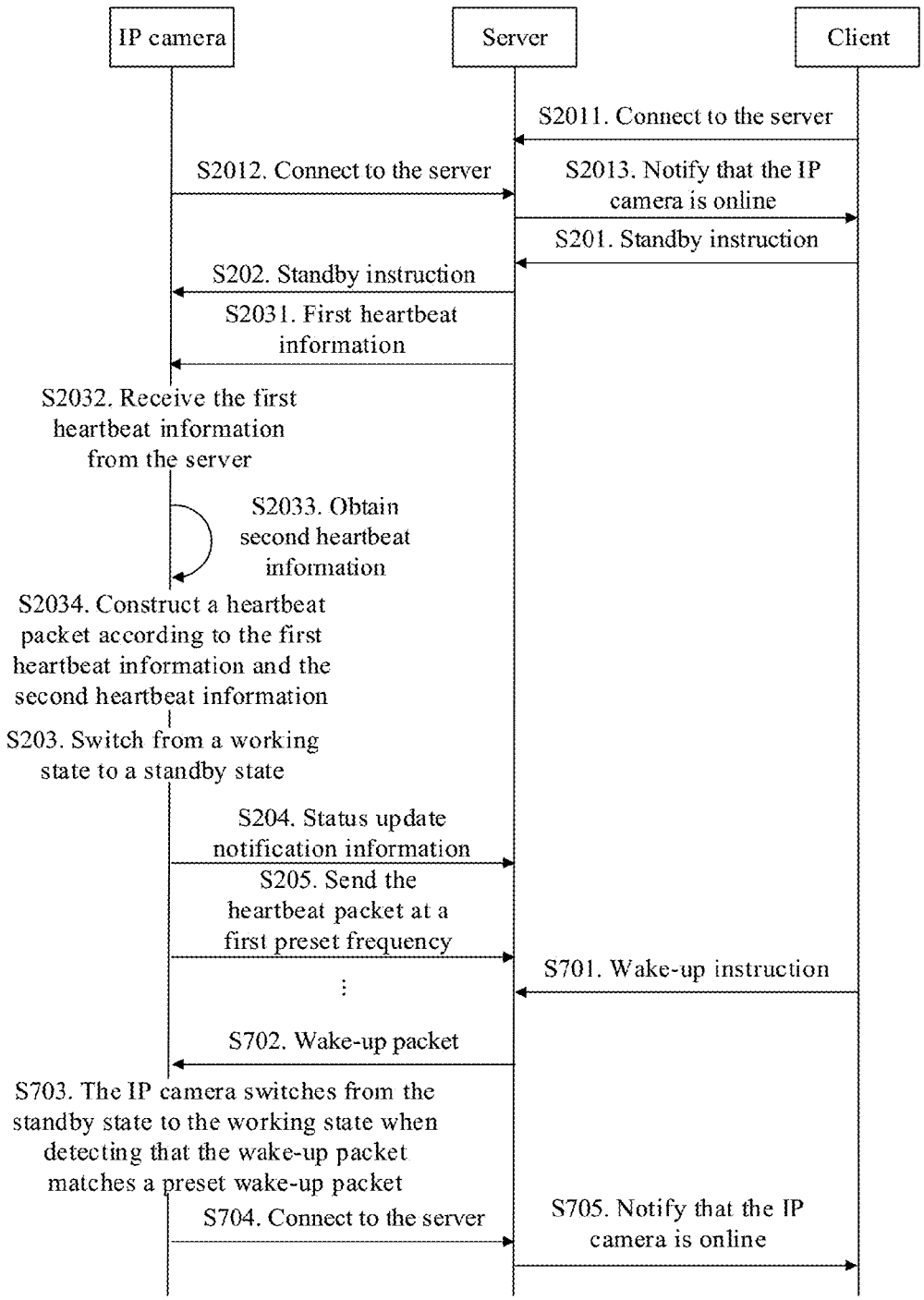
FIG. 7 is a signaling interaction diagram of an IP camera control method according to Embodiment 4 of the present disclosure.

FIG. 7 is a signaling interaction diagram of an IP camera control method according to Embodiment 4 of the present disclosure. As shown in FIG. 7, with reference to FIG. 4, the method provided by this embodiment of the present disclosure further includes the following steps.

Step S701: The client sends a wake-up instruction to the server.

The wake-up instruction includes the port number and the communication address of the IP camera to be woken up.

Further, when the user requires the IP camera for monitoring, the user inputs the wake-up instruction on the mobile client, where the wake-up instruction includes the port number and the communication address of the IP camera to be woken up. The mobile client sends the wake-up instruction input by the user to the cloud server, notifying the cloud server which IP camera needs to be woken up.

Step S702: The server sends a wake-up packet to the IP camera according to the port number and the communication address of the IP camera to be woken up.

The server searches, according to the port number and the communication address of the IP camera to be woken up, for the wake-up packet for waking up the IP camera, and sends the wake-up packet to the IP camera such that the IP camera switches from the standby state to the working state when the wake-up packet received by the IP camera matches a preset wake-up packet.

It should be noted that, the wake-up packet provided by this embodiment of the present disclosure may be sent through a wide area network, and no associated router configuration is required. The wake-up packet is pre-agreed between the server and the IP camera. The manufacturer may define the wake-up packet pre-agreed between the server and the IP camera in order to adapt to interconnection between different servers and IP cameras. This is not limited and not described again herein in this embodiment.

Step S703: The IP camera switches from the standby state to the working state when the IP camera detects that the wake-up packet from the server matches a preset wake-up packet.

The IP camera in the standby state periodically detects received data content using the WI-FI module. If a wake-up packet that matches the preset wake-up packet is detected, a wake-on-LAN (WOL) technology is used. The WI-FI module wakes up the MCU by outputting a level required by a general purpose input output interface of the MCU. The MCU wakes up from sleep and activates the PMU to power on each module of the IP camera, thereby achieving an objective of waking up the IP camera to continue working.

Step S704: The IP camera connects to the server.

The IP camera connects to the server after the IP camera is woken up. Because a network path keeps smooth, video-related content and the like may be quickly pushed to the client, ensuring that an emergency monitored by the IP camera can be conveyed to the user quickly.

Step S705: The server notifies the client that the IP camera is online.

Further, when the IP camera connects to the server, the server notifies the client that the IP camera is online in order to ensure that the user can know the status of the IP camera in time. This facilitates the user in performing remote access control and management using a mobile network (for example, 3G or 4G), and previewing videos recorded by the IP camera.

In the IP camera control method provided by this embodiment of the present disclosure, on a basis of the foregoing embodiment, a user inputs a wake-up instruction on a client. A server sends a wake-up packet to an IP camera, and the IP camera switches from a standby state to a working state when the IP camera detects that the wake-up packet from the server matches a preset wake-up packet such that when the IP camera receives a wake-up instruction from the user, the IP camera restarts and quickly goes online, and sends, within a time preset by the user, video data for the user to preview.

Figure 8:
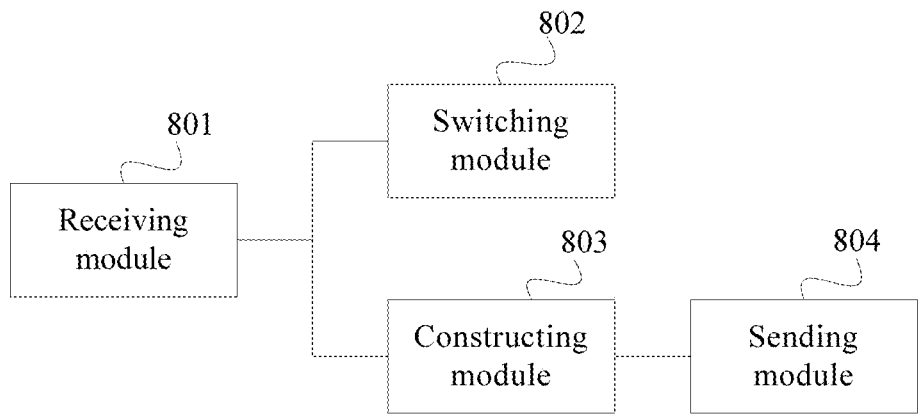
FIG. 8 is a schematic structural diagram of an IP camera according to Embodiment 1 of the present disclosure.

FIG. 8 is a schematic structural diagram of an IP camera according to Embodiment 1 of the present disclosure. As shown in FIG. 8, the IP camera provided by this embodiment of the present disclosure includes a receiving module 801 and a switching module 802.

The receiving module 801 is configured to receive a standby instruction.

The switching module 802 is configured to switch from a working state to a standby state when the standby instruction from a server is received.

The IP camera provided by this embodiment of the present disclosure is configured to execute the technical solution of the method embodiment shown in FIG. 2. Implementation principles and technical effects thereof are similar, and details are not described again herein.

In the embodiment shown in FIG. 8, the IP camera further includes a constructing module 803 and a sending module 804.

The constructing module 803 is configured to construct a heartbeat packet to be transmitted between the IP camera and the server.

The sending module 804 is configured to send the heartbeat packet to the server at a first preset frequency such that the IP camera maintains a heartbeat connection to the server.

In the embodiment shown in FIG. 8, the constructing module 803 is further configured to receive first heartbeat information from the server, where the first heartbeat information includes a communication address and a port number of the server, obtain second heartbeat information, where the second heartbeat information includes a communication address and a port number of the IP camera, and construct the heartbeat packet according to the first heartbeat information and the second heartbeat information, where the heartbeat packet is a data frame that includes the port number of the server, the communication address of the server, the port number of the IP camera, and the communication address of the IP camera.

In the embodiment shown in FIG. 8, the sending module 804 is further configured to send status update notification information to the server, where the status update notification information notifies that a status of the IP camera is updated to the standby state.

In the embodiment shown in FIG. 8, the receiving module 801 is further configured to receive, at a third preset frequency, a beacon from a router, the IP camera connects to the router when receiving the beacon from the router, and at intervals of receiving a beacon from the router, the IP camera disconnects from the router.

In the embodiment shown in FIG. 8, the receiving module 801 is further configured to receive a wake-up packet from the server, and the switching module 802 is further configured to switch from the standby state to the working state when the wake-up packet from the server matches a preset wake-up packet.

Figure 9:
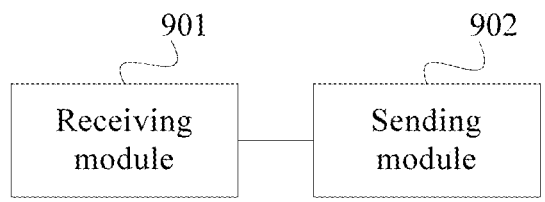
FIG. 9 is a schematic structural diagram of a server according to Embodiment 1 of the present disclosure.

FIG. 9 is a schematic structural diagram of a server according to Embodiment 1 of the present disclosure. As shown in FIG. 9, the server provided by this embodiment of the present disclosure includes a receiving module 901 and a sending module 902.

The receiving module 901 is configured to receive a standby instruction from a client.

The sending module 902 is configured to send the standby instruction to an IP camera according to a port number and a communication address of the IP camera such that the IP camera switches from a working state to a standby state after receiving the standby instruction.

The server provided by this embodiment of the present disclosure is configured to execute the technical solution of the method embodiment shown in FIG. 2. Implementation principles and technical effects thereof are similar, and details are not described again herein.

In the embodiment shown in FIG. 9, the sending module 902 is further configured to send first heartbeat information to the IP camera, where the first heartbeat information includes a communication address and a port number of the server such that the IP camera constructs, according to the first heartbeat information, a heartbeat packet to be transmitted between the IP camera and the server.

The receiving module 901 is further configured to receive, at a first preset frequency, the heartbeat packet from the IP camera such that the server maintains a heartbeat connection to the IP camera.

In the embodiment shown in FIG. 9, the receiving module 901 is further configured to receive status update notification information from the IP camera, where the status update notification information notifies that a status of the IP camera is updated to the standby state.

In the embodiment shown in FIG. 9, the receiving module 901 is further configured to receive a wake-up instruction from the client, where the wake-up instruction includes the port number and the communication address of the IP camera to be woken up.

The sending module 902 is further configured to send a wake-up packet to the IP camera according to the port number and the communication address of the IP camera to be woken up such that the IP camera switches from the standby state to the working state when the wake-up packet received by the IP camera matches a preset wake-up packet.

Figure 10:
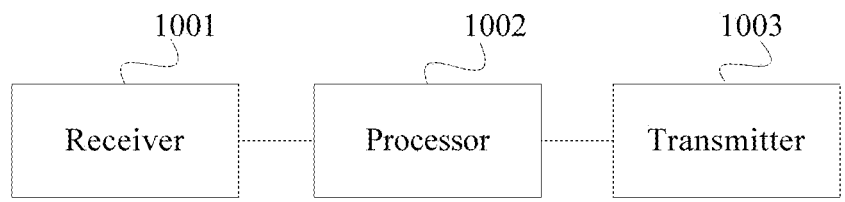
FIG. 10 is a schematic structural diagram of an IP camera according to Embodiment 2 of the present disclosure.

FIG. 10 is a schematic structural diagram of an IP camera according to Embodiment 2 of the present disclosure. As shown in FIG. 10, the IP camera provided by this embodiment of the present disclosure includes a receiver 1001 and a processor 1002.

The receiver 1001 is configured to receive a standby instruction.

The processor 1002 may be a general purpose processor, including a central processing unit (CPU), a network processor (NP), or the like, or may be a digital signal processor (DSP), an application-specific integrated circuit (ASIC), a field-programmable gate array (FPGA), or other programmable logical components.

The IP camera may further include a memory configured to store a program when the processor 1002 is a CPU. The program may include program code, and the program code includes a computer operation instruction. The memory may include a random access memory (RAM), or may further include a non-volatile memory, for example, at least one disk storage. The processor 1002 communicates with the memory when the IP camera runs, and the processor 1002 invokes the instruction stored in the memory to perform the operation of switching from a working state to a standby state when the standby instruction from a server is received.

The processor 1002 is further configured to perform the operation of constructing a heartbeat packet to be transmitted between the IP camera and the server.

In the embodiment shown in FIG. 10, the IP camera further includes a transmitter 1003.

The transmitter 1003 is configured to send the heartbeat packet to the server at a first preset frequency such that the IP camera maintains a heartbeat connection to the server.

The processor 1002 is further configured to perform the operations of receiving first heartbeat information from the server, where the first heartbeat information includes a communication address and a port number of the server, obtaining second heartbeat information, where the second heartbeat information includes a communication address and a port number of the IP camera, and constructing the heartbeat packet according to the first heartbeat information and the second heartbeat information, where the heartbeat packet is a data frame that includes the port number of the server, the communication address of the server, the port number of the IP camera, and the communication address of the IP camera.

The receiver 1001 is further configured to receive a wake-up packet from the server.

The processor 1002 is further configured to perform the operation of switching from the standby state to the working state when the wake-up packet from the server matches a preset wake-up packet.

In the embodiment shown in FIG. 10, the transmitter 1003 is further configured to send status update notification information to the server, where the status update notification information notifies that a status of the IP camera is updated to the standby state.

In the embodiment shown in FIG. 10, the receiver 1001 is further configured to receive, at a third preset frequency, a beacon from a router. The IP camera connects to the router when receiving the beacon from the router, and the IP camera disconnects from the router at intervals of receiving a beacon from the router.

The IP camera provided by this embodiment of the present disclosure is configured to execute the technical solution of the method embodiment shown in FIG. 2. Implementation principles and technical effects thereof are similar, and details are not described again herein.

Figure 11:
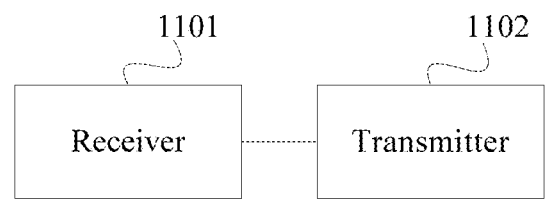
FIG. 11 is a schematic structural diagram of a server according to Embodiment 2 of the present disclosure.

FIG. 11 is a schematic structural diagram of a server according to Embodiment 2 of the present disclosure. As shown in FIG. 11, the server provided by this embodiment of the present disclosure includes a receiver 1101 and a transmitter 1102.

The receiver 1101 is configured to receive a standby instruction from a client.

The transmitter 1102 is configured to send the standby instruction to an IP camera according to a port number and a communication address of the IP camera such that the IP camera switches from a working state to a standby state after receiving the standby instruction.

The server provided by this embodiment of the present disclosure is configured to execute the technical solution of the method embodiment shown in FIG. 2. Implementation principles and technical effects thereof are similar, and details are not described again herein.

In the embodiment shown in FIG. 11, the transmitter 1102 is further configured to send first heartbeat information to the IP camera, where the first heartbeat information includes a communication address and a port number of the server such that the IP camera constructs, according to the first heartbeat information, a heartbeat packet to be transmitted between the IP camera and the server.

The receiver 1101 is further configured to receive, at a first preset frequency, the heartbeat packet from the IP camera such that the server maintains a heartbeat connection to the IP camera.

In the embodiment shown in FIG. 11, the receiver 1101 is further configured to receive status update notification information from the IP camera, where the status update notification information notifies that a status of the IP camera is updated to the standby state.

In the embodiment shown in FIG. 11, the receiver 1101 is further configured to receive a wake-up instruction from the client, where the wake-up instruction includes the port number and the communication address of the IP camera to be woken up.

The transmitter 1102 is further configured to send a wake-up packet to the IP camera according to the port number and the communication address of the IP camera to be woken up such that the IP camera switches from the standby state to the working state when the wake-up packet received by the IP camera matches a preset wake-up packet.

Figure 12:
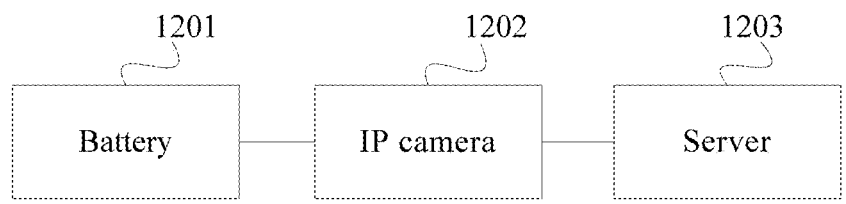
FIG. 12 is a schematic structural diagram of an IP camera control system according to an embodiment of the present disclosure.

FIG. 12 is a schematic structural diagram of an IP camera control system according to an embodiment of the present disclosure. As shown in FIG. 12, the system includes a battery 1201, an IP camera 1202 according to any one of the foregoing embodiments, and a server 1203 according to any one of the foregoing embodiments.

Further, in this embodiment of the present disclosure, the IP camera 1202 is powered by the battery 1201 and deployed flexibly. This avoids a disadvantage that a monitoring position is fixed and the monitoring position is limited when a current IP camera 1202 is powered by a power adapter.

Implementation principles and technical effects of the IP camera 1202 are the same as those of the IP camera provided by the foregoing embodiment, and are not limited and not described again herein in this embodiment.

Implementation principles and technical effects of the server 1203 are the same as those of the server provided by the foregoing embodiment, and are not limited and not described again herein in this embodiment.

In the IP camera control system provided by this embodiment of the present disclosure, when a user inputs a standby instruction on a client, a cloud server forwards the standby instruction to the IP camera 1202. The IP camera 1202 enters a standby state after receiving the standby instruction. After a monitoring condition is triggered and when required by the user, the IP camera 1202 may be powered on to work and record a video. At other times, the IP camera 1202 enters the standby state. Because power consumption of the IP camera 1202 in the standby state is low, the IP camera 1202 is prevented from being always in a working state, and power consumption of the IP camera 1202 is reduced.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An Internet Protocol (IP) camera control method, comprising:
   receiving, by an IP camera, a standby instruction from a server;
   switching, by the IP camera, from a working state to a standby state when receiving the standby instruction from the server, the standby state comprising powering off a security chip and an image sensor of the IP camera;
   constructing, by the IP camera, a heartbeat packet when in the standby state;
   sending, by the IP camera, the heartbeat packet to the server at a first preset frequency to make the IP camera maintain a heartbeat connection to the server;
   receiving, by the IP camera, a wake-up instruction from the server; and
   switching, by the IP camera, from the standby state to the working state when receiving the wake-up instruction from the server, the working state comprising powering on the security chip and the image sensor of the IP camera.

2. The method of claim 1, wherein constructing the heartbeat packet comprises:
   receiving, by the IP camera, first heartbeat information from the server, the first heartbeat information comprising a communication address and a port number of the server;
   obtaining, by the IP camera, second heartbeat information, the second heartbeat information comprising a communication address and a port number of the IP camera; and
   constructing, by the IP camera, the heartbeat packet according to the first heartbeat information and the second heartbeat information, the heartbeat packet being a data frame comprising the port number of the server, the communication address of the server, the port number of the IP camera, and the communication address of the IP camera.

3. The method of claim 1, wherein before sending the heartbeat packet to the server, the method further comprises sending, by the IP camera, status update notification information to the server, the status update notification information notifying that a status of the IP camera is updated to the standby state.

4. The method of claim 1, wherein after switching from the working state to the standby state, the method further comprises:
   receiving, by the IP camera at a third preset frequency, a beacon from a router;
   turning on, by a WI-FI component, a radio frequency receiver to make the IP camera connect to the router when receiving the beacon from the router; and
   turning off, by the WI-FI component, the radio frequency receiver to make the IP camera disconnect from the router.

5. The method of claim 1, wherein after switching from the working state to the standby state, the method further comprises:
   waking up, by a WI-FI component, a micro controller by outputting a level required by a general purpose input output interface of the micro controller when the WI-FI component detects that the wake-up instruction matches a preset wake-up instruction; and
   activating, by the micro control unit, a power management unit to power on each component of the IP camera.

6. An Internet Protocol (IP) camera, comprising:
   a receiver configured to separately receive a standby instruction and a wake-up instruction from a server;
   a memory comprising instructions;
   one or more processors in communication with the receiver and the memory, the one or more processors being configured to execute the instructions to:
      switch from a working state to a standby state when receiving the standby instruction from the server, the standby state comprising powering off a security chip and an image sensor of the IP camera;
      switch from the standby state to the working state when receiving the wake-up instruction from the server, the working state comprising powering on the security chin and the image sensor of the IP camera; and
      construct a heartbeat packet when in the standby state; and
   a transmitter coupled to the one or more processors and configured to send the heartbeat packet to the server at a first preset frequency to make the IP camera maintain a heartbeat connection to the server.

7. The IP camera of claim 6, wherein the receiver is further configured to receive first heartbeat information from the server, the first heartbeat information comprising a communication address and a port number of the server, and the one or more processors further executing the instructions to:
   obtain second heartbeat information, the second heartbeat information comprising a communication address and a port number of the IP camera; and
   construct the heartbeat packet according to the first heartbeat information and the second heartbeat information, the heartbeat packet being a data frame comprising the port number of the server, the communication address of the server, the port number of the IP camera, and the communication address of the IP camera.

8. The IP camera of claim 6, wherein the transmitter is further configured to send status update notification information to the server, and the status update notification information notifying that a status of the IP camera is updated to the standby state.

9. The IP camera of claim 6, wherein the receiver is further configured to receive, at a third preset frequency, a beacon from a router, the IP camera connecting to the router when receiving the beacon from the router, and the IP camera disconnecting from the router at intervals of receiving the beacon from the router.

10. The IP camera of claim 6, wherein the receiver is further configured to wake up a micro controller by outputting a level required by a general purpose input output interface of the micro controller when the wake-up instruction matches a preset wake-up instruction, and the micro controller being further configured to activate a power management processor to power on each component of the IP camera.

11. A computer program product comprising a non-transitory computer readable storage medium storing program code thereon for an Internet Protocol (IP) camera control, the program code comprising instructions for executing a method that comprises:
   receiving, by an IP camera, a standby instruction from a server;
   switching, by the IP camera, from a working state to a standby state when receiving the standby instruction from the server, the standby state comprising powering off a security chip and an image sensor of the IP camera;
   constructing, by the IP camera, a heartbeat packet when in the standby state;
   sending, by the IP camera, the heartbeat packet to the server at a first preset frequency to make the IP camera maintain a heartbeat connection to the server;
   receiving, by the IP camera, a wake-up instruction from the server; and
   switching, by the IP camera, from the standby state to the working state when receiving the wake-up instruction from the server, the working state comprising powering on the security chip and the image sensor of the IP camera.

12. The computer program product of claim 11, wherein constructing the heartbeat packet to be transmitted between the IP camera and the server comprises:
   receiving, by the IP camera, first heartbeat information from the server, the first heartbeat information comprising a communication address and a port number of the server;
   obtaining, by the IP camera, second heartbeat information, the second heartbeat information comprising a communication address and a port number of the IP camera; and
   constructing, by the IP camera, the heartbeat packet according to the first heartbeat information and the second heartbeat information, the heartbeat packet being a data frame comprising the port number of the server, the communication address of the server, the port number of the IP camera, and the communication address of the IP camera.

13. The computer program product of claim 11, wherein before sending the heartbeat packet to the server, the method further comprises sending, by the IP camera, status update notification information to the server, the status update notification information notifying that a status of the IP camera is updated to the standby state.

14. The computer program product of claim 11, wherein after switching from the working state to the standby state, the method further comprises:
   receiving, by the IP camera at a third preset frequency, a beacon from a router;
   turning on, by a WI-FI component, a radio frequency receiver to make the IP camera connect to the router when receiving the beacon from the router; and
   turning off, by the WI-FI component, the radio frequency receiver to make the IP camera disconnect from the router.

15. The computer program product of claim 11, wherein after switching from the working state to the standby state, the method further comprises:
   waking up, by a WI-FI component, a micro controller by outputting a level required by a general purpose input output interface of the micro controller when the WI-FI module detects that the wake-up instruction matches a preset wake-up instruction; and
   activating, by the micro control unit, a power management unit to power on each component of the IP camera.

16. The method of claim 1, wherein the IP camera is remotely connected to a client through the server, the standby instruction from the server is received by the server from the client and is forwarded to the IP camera, and the wake-up instruction from the server is received by the server from the client and is forwarded to the IP camera.

17. The method of claim 1, wherein the security chip provides the IP camera with functionality for video capture, processing, encoding, packetization, and network transmission using a WI-FI connection.

18. The IP camera of claim 6, wherein the IP camera is remotely connected to a client through the server, the standby instruction from the server is received by the server from the client and is forwarded to the IP camera, and the wake-up instruction from the server is received by the server from the client and is forwarded to the IP camera.

19. The camera of claim 6, wherein the security chip provides the IP camera with functionality for video capture, processing, encoding, packetization, and network transmission using a WI-FI connection.

20. The computer program product of claim 11, wherein the IP camera is remotely connected to a client through the server, the standby instruction from the server is received by the server from the client and is forwarded to the IP camera, the wake-up instruction from the server is received by the server from the client and is forwarded to the IP camera, and the security chip providing the IP camera with functionality for video capture, processing, encoding, packetization, and network transmission using a WI-FI connection.

* * * * *

UNITED STATES PATENT AND TRADEMARK OFFICE
CERTIFICATE OF CORRECTION

PATENT NO. : 10,136,060 B2
APPLICATION NO. : 15/624371
DATED : November 20, 2018
INVENTOR(S) : Can Liu and Gaofei Li Page 1 of 1

It is certified that error appears in the above-identified patent and that said Letters Patent is hereby corrected as shown below:

On the Title Page

Item (30), Line 1: "201610422371" should read "201610422371.8"

In the Claims

Column 16, Line 46: Claim 6 "chin" should read "chip"

Column 18, Line 47: Claim 19 insert --IP-- before "camera"

Signed and Sealed this
Twenty-second Day of January, 2019

Andrei Iancu
*Director of the United States Patent and Trademark Office*